(12) United States Patent
McDowall

(10) Patent No.: US 8,225,296 B2
(45) Date of Patent: Jul. 17, 2012

(54) METHOD FOR SELECTING PLUG-IN CODE MODULES IN A COMPUTING DEVICE

(75) Inventor: Karl McDowall, Notts (GB)

(73) Assignee: Nokia Corporation (FI)

( * ) Notice: Subject to any disclaimer, the term of this patent is extended or adjusted under 35 U.S.C. 154(b) by 1589 days.

(21) Appl. No.: 11/570,276

(22) PCT Filed: Jun. 8, 2005

(86) PCT No.: PCT/GB2005/002250
§ 371 (c)(1),
(2), (4) Date: Dec. 8, 2006

(87) PCT Pub. No.: WO2005/121955
PCT Pub. Date: Dec. 22, 2005

(65) Prior Publication Data
US 2007/0234321 A1 Oct. 4, 2007

(30) Foreign Application Priority Data
Jun. 9, 2004 (GB) .................................. 0413060.5

(51) Int. Cl.
*G06F 9/44* (2006.01)
*G06F 9/45* (2006.01)

(52) U.S. Cl. ...................................... 717/141; 717/162
(58) Field of Classification Search ......................... None
See application file for complete search history.

(56) References Cited

U.S. PATENT DOCUMENTS

| 5,838,906 | A | 11/1998 | Doyle et al. |
| 6,006,279 | A * | 12/1999 | Hayes ........................... 719/328 |
| 6,279,030 | B1 | 8/2001 | Britton et al. |
| 6,513,153 | B1 | 1/2003 | Lee |
| 6,651,084 | B1 * | 11/2003 | Kelley et al. .................. 709/202 |
| 6,742,176 | B1 * | 5/2004 | Million et al. ................ 717/120 |
| 7,292,531 | B1 * | 11/2007 | Hill ............................ 370/230.1 |
| 7,308,490 | B2 * | 12/2007 | Peiffer et al. ................. 709/219 |
| 7,769,895 | B1 * | 8/2010 | Williams et al. .............. 709/246 |
| 2003/0192041 | A1 | 10/2003 | Mentze et al. |
| 2005/0080876 | A1 * | 4/2005 | Peiffer et al. ................. 709/217 |
| 2006/0031404 | A1 * | 2/2006 | Kassab ........................ 709/218 |

(Continued)

FOREIGN PATENT DOCUMENTS
EP 1351138 8/2003
(Continued)

OTHER PUBLICATIONS

Loader, "Bandwidth Selection: Classical or Plug-In?," The Annals of Statistics, vol. 27, No. 2 (Apr. 1999), pp. 415-438, Published by: Institute of Mathematical Statistics.*

(Continued)

*Primary Examiner* — Insun Kang
(74) *Attorney, Agent, or Firm* — Alston & Bird LLP

(57) ABSTRACT

A plug-in for execution by an application on a computing device is selected by arranging for a server to iterate through available plug-ins, asking each plug-in in succession if it can better match the criteria required by the application than the previous plug-in. The plug-in having the closest match to the criteria is then executed by the application.

20 Claims, 4 Drawing Sheets

U.S. PATENT DOCUMENTS

| | | | | |
|---|---|---|---|---|
| 2008/0071877 A1* | 3/2008 | Beach | | 709/207 |
| 2008/0222243 A1* | 9/2008 | Shaw | | 709/203 |
| 2010/0153583 A1* | 6/2010 | Harris et al. | | 709/246 |
| 2010/0228880 A1* | 9/2010 | Hunt et al. | | 709/246 |

FOREIGN PATENT DOCUMENTS

| WO | WO0067114 | 11/2000 |
|---|---|---|
| WO | WO02086709 | 10/2002 |

OTHER PUBLICATIONS

Goldstein,"Optimal plug-in estimators for nonparametric functional estimation," The annals of statistics, 1992—JSTOR.*

International Search Report and Written Opinion for International Application No. PCT/GB2005/002250, mailed Sep. 13, 2005.

Search Report for Great Britain Application No. GB0413060.5, dated Oct. 6, 2004.

* cited by examiner

METHOD FOR SELECTING PLUG-IN CODE MODULES IN A COMPUTING DEVICE

CROSS REFERENCE TO RELATED APPLICATIONS

This application claims the priority of PCT/GB2005/002250 filed on Jun. 8, 2005, and, GB 0413060.5 filed on Jun. 9, 2004, the entire contents of which are hereby incorporated in total by reference.

The present invention relates to a method of operating a computing device, and in particular to a method of operating such a device for enabling the device to resolve which out of a number of plug-ins is the best-fit to the attributes specified by a requesting application on the device.

The term computing device as used herein is to be expansively construed to cover any form of computing device and includes data recording devices of any form factor, computers of any type or form, including hand held and personal computers, and communication devices of any form factor, including mobile phones, smart phones, communicators which combine communications, image recording and/or playback, and computing functionality within a single device, and other forms of wireless and wired information devices.

A plug-in can be defined as a replaceable item of executable code that provides specific services to a loosely coupled application that can load or invoke the plug-in at run-time. Plug-ins are commonly loaded as dynamic link libraries (DLLs) or similar type of modules which execute within the same process space as the application which invokes them, though they can also be spawned and run as separate processes.

Plug-ins are widely used in many operating systems and by many applications. The main advantages of this technology are:
  Applications able to use plug-ins are inherently extensible, as plug-in modules can be added or replaced when new features are required
  Operating code for plug-ins is loaded by applications only on demand, enabling programs to make smaller demands on device memory and be quicker to launch.

This technology is familiar to most users of computing devices through the widespread incorporation of plug-ins in web browsers such as Microsoft Internet Explorer and Netscape, which was the subject of U.S. Pat. No. 5,838,906 (commonly known as the Eolas patent). As well as being the basis for running Java applets inside browsers, the most common manifestation of the use of plug-ins is that browser applications rely on them to render certain types of content. The use of plug-ins in relation to multimedia files is particularly widespread.

Because plug-ins are by definition inherently independent of the applications that load them, it is necessary for all systems that use plug-in technology to provide mechanisms by which applications are made aware of available plug-ins and are advised of the method for loading or invoking them.

Early mechanisms, such as those used by Windows™ applications depending solely on OLE technology from Microsoft, required hard-coded links to the plug-in names and locations. This is regarded as unsatisfactory, because it permits only plug-in replacement and requires the host application to be updated to permit the addition of extra plug-in components.

Subsequent mechanisms store names and locations of plug-ins in a registry or plug-in database; this is considered superior to the hard-coding of names as it is both flexible and extensible. For maximum flexibility, and to enable the same plug-ins to be used by different applications, such registries or databases are typically system wide rather than application-specific. It is therefore common for one or more intermediate layers to be provided between applications and their plug-ins which provide common services, including:
  The location of suitable registered plug-ins for applications
  Deciding which plug-in among potential plug-in candidates should be invoked
  Instantiating the plug-in on behalf of the application Microsoft's Component Object Model (COM) is one well-known method of doing this whereby the operating system provides an intermediate layer which locates the plug-in module in a registry, handles the instantiation, and then redirects calls from the application to the plug-in instance. COM was developed so that software manufacturers could plug new accessories into existing applications without requiring a rebuild of the existing application. COM components should therefore be designed as interchangeable plug-ins whether the COM component is a local in-process DLL or a remote server executable.

WO 00/67114 in the name of Sun Microsystems describes "A System and Method for discovering and binding a program object" by which an intermediate layer uses a registry to discover and instantiate a plug-in and then returns a reference to the instance back to the application in order that it may communicate with it directly.

System-wide mechanisms such as these are often combined with less generic intermediate levels such as application-specific plug-in managers, or specialized servers which allow plug-ins to be used to service multiple simultaneous applications.

One concern with the current technology is that where there are a number of plug-in candidates, the choice of which plug-in is the most suitable can be a highly technical process which requires potentially complex decision-making intelligence or algorithms in order to arrive at the optimal selection.

Any approach based on the intermediate making such decisions would require it to maintain possibly complex state information, and be party to specialized information. Depending on how generic the intermediaries are, this could result in unnecessarily bloated code owing to the inclusion of routines for all types of existing plug-ins. Architecturally, this is at odds with the role of generic service layers which should restrict themselves to providing common services such as locating and instantiating plug-ins. Thus, all types of intermediaries are likely to prove inadequate for dealing with new types of plug-ins which may not have been known about at the time the intermediate layer was written.

One specific case which illustrates these concerns is the implementation of Location Based Services (LBS) on a wireless information device such as a mobile telephone. LBS includes location-based information, location-sensitive billing, emergency services and location tracking. All of these features depend on the mobile phone being able to tell where it is (positioning). However, there are many different ways of obtaining positioning information. The most widely recognized system uses Global Positioning System (GPS). There are also alternative technologies in use, many of which are network based, such as cell triangulation. It is also known that the available method for obtaining positioning information will expand in the future; for instance, the European Galileo project will eventually provided an alternative to GPS.

Those skilled in the art will recognize that a plug-in design for implementing LBS, which allows an application to use any method for obtaining positioning information, would be highly appropriate and provide significant benefits. This is because:

all the positioning techniques mentioned above provide identical information types they can all be written to conform to precisely the same application programming interfaces (API)

an application, in general, will only need to use one of them.

However, the above techniques for obtaining position have significantly different characteristics, such as accuracy, power required, cost to the user and the time taken to obtain a positioning fix. The choice of which one to invoke is therefore a complex one which is dependent on a number of factors. No intermediate layer for invoking plug-ins would be capable of taking all these into account. In the worst case, an inability to make a sensible decision on how to obtain positioning information would result in the use of a simple 'last-fit' mechanism, whereby the most recently installed matching plug-in that conforms to the appropriate API is instantiated.

It is therefore apparent that there is currently no flexible and extensible way of automatically determining which plug-in should be used in situations where a device has multiple plug-ins available, each of which could perform a particular task, but in a sufficiently different manner to make it advantageous to choose a particular plug-in for a particular circumstance.

Accordingly, it is an object of the present invention to provide an improved method for selecting plug-ins in a computing device.

DESCRIPTION OF PREFERRED EMBODIMENT OF THE INVENTION

Figure 1:
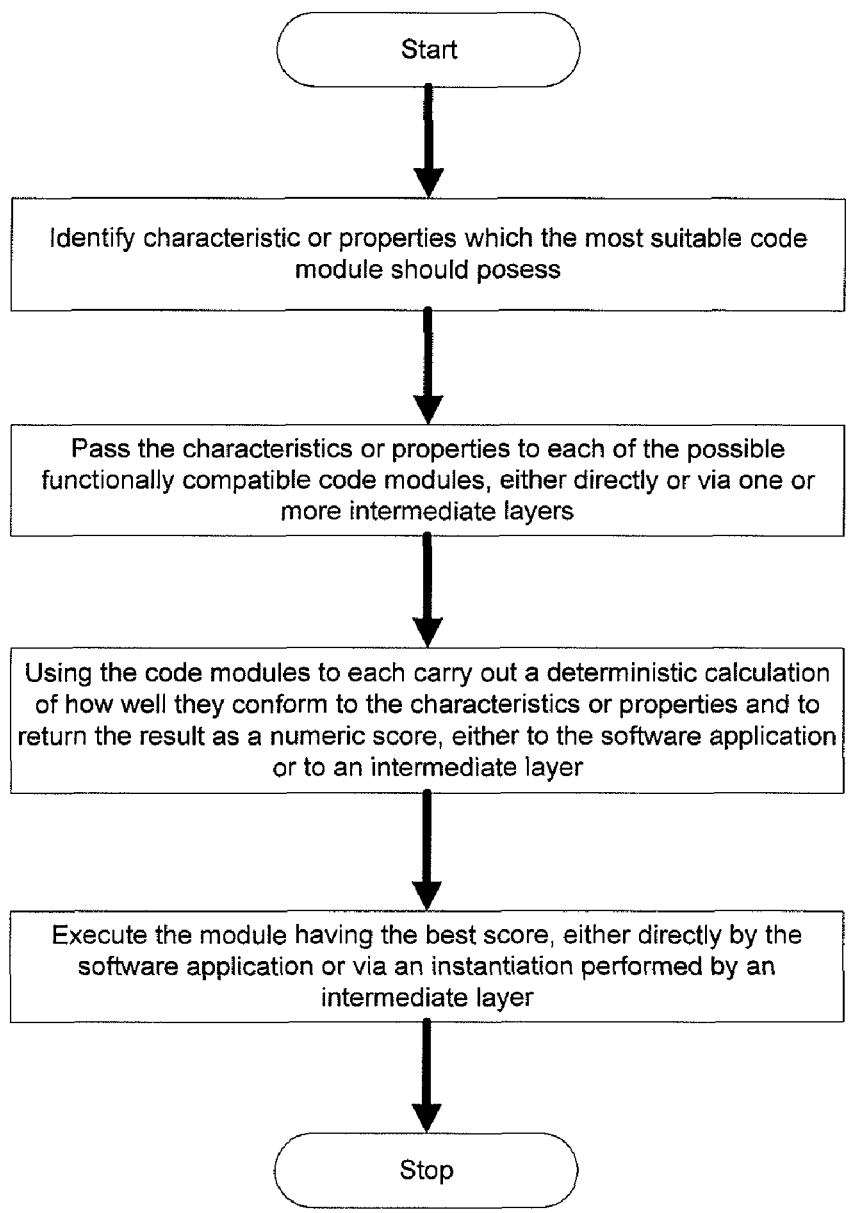
FIG. 1 illustrates a first aspect of the preferred embodiment of the invention in which a flow diagram is provided showing the method steps for enabling a software application running on a computing device to cause the most suitable code module from a set of code modules to be executed.

According to a first aspect of the present invention, as shown in FIG. 1, there is provided a method for enabling a software application running on a computing device to cause the most suitable code module from a set of code modules to be executed, the method comprising a) identifying characteristic or properties which the most suitable code module should possess;

b) passing the characteristics or properties to each of the possible functionally compatible code modules, either directly or via one or more intermediate layers;

c) using the code modules to each carry out a deterministic calculation of how well they conform to the characteristics or properties and to return the result as a numeric score, either to the software application or to an intermediate layer; and d) executing the module having the best score, either directly by the software application or via an instantiation performed by an intermediate layer.

According to a second aspect of the present invention there is provided a computing device arranged to operate in accordance with the method of the first aspect.

According to a third aspect of the present invention there is provided an operating system for causing a computing device according to the second aspect to operate in accordance with a method of the first aspect.

The Symbian OS™ operating system for mobile phones produced by Symbian Software Ltd, of London has made extensive use of plug-ins since its first release in 1997. While these plug-ins have traditionally been based around polymorphic DLLs which are loaded by the type of intermediate layer described above, an increasing number are proposed to be implemented as executables running in their own process space. This invention can be applied to either type of plug-in.

While the invention described here describes how to solve the problem outlined above in the context of LBS, it will readily be appreciated by those skilled in the art that the principles underlying the invention are equally applicable to any situation where a choice between possible plug-ins needs to be made. Hence, the case of LBS is used for illustrative purposes only and is not to be construed as restricting the scope or applicability of the invention in other areas. Likewise, the Symbian OS™ operating system as described herein is also used for illustrative purposes only and is also not to be construed as restricting the scope or applicability of the invention in relation to other operating systems, as will be apparent to persons familiar with this art.

The Location Based Services positioning sub-system in the Symbian OS™ operating system employs a client/server framework architecture to allow multiple clients (applications) to retrieve periodic updates of the device location from multiple location technologies.

This architecture comprises a singleton location server that is technology independent and which is accessed through a consistent application program interface (API) which provides a technology-independent abstraction layer suitable for any of the methods described earlier.

The server manages access to location-technology-specific modules. These modules are implemented as plug-ins, which can be added to or removed from the operating system dynamically, and which are detected and used by the location server without the client applications needing to know.

When a client connects to the location server it can offer a criteria object to specify desired or required properties of the location technology to be used. These criteria objects are specified in the abstraction API and allow Quality of Service (QoS) parameters, such as horizontal accuracy, vertical accuracy, or time to first fix, to be specified. Other parameters of potential interest to the application can also be specified, such as cost and power consumption.

Figure 2:
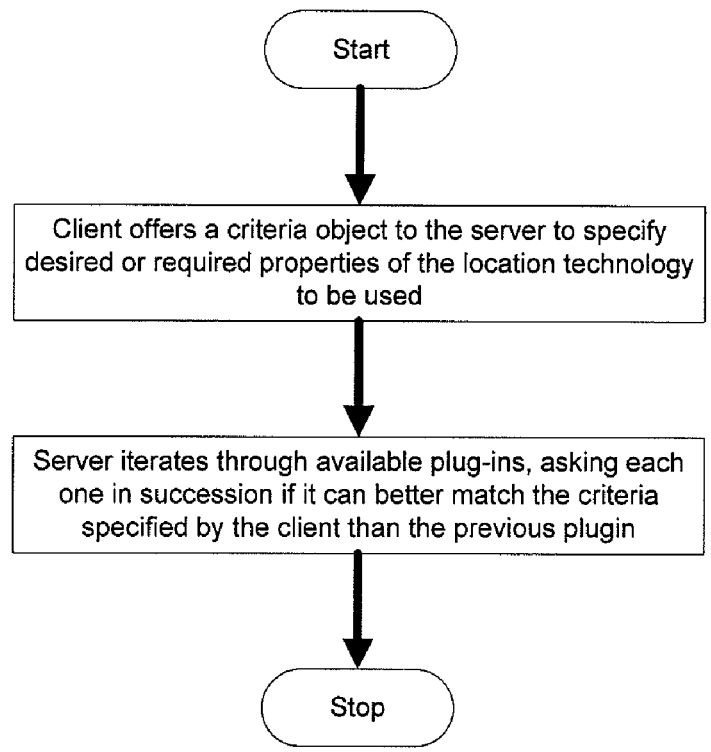
FIG. 2 illustrates the steps by which a client sets up criteria to specify desired properties of the location technology to be used and how the server iterates through available plug-ins if a better match can be made to the criteria specified by the client.

With the present invention, as shown in FIG. 2, the location server iterates through the available plug-ins, asking each one in succession if it can better match the criteria specified by the client than the previous plug-in. The location server itself is unaware of how the resolution of 'better/worse' is being carried out from plug-in to plug-in.

Figure 3:
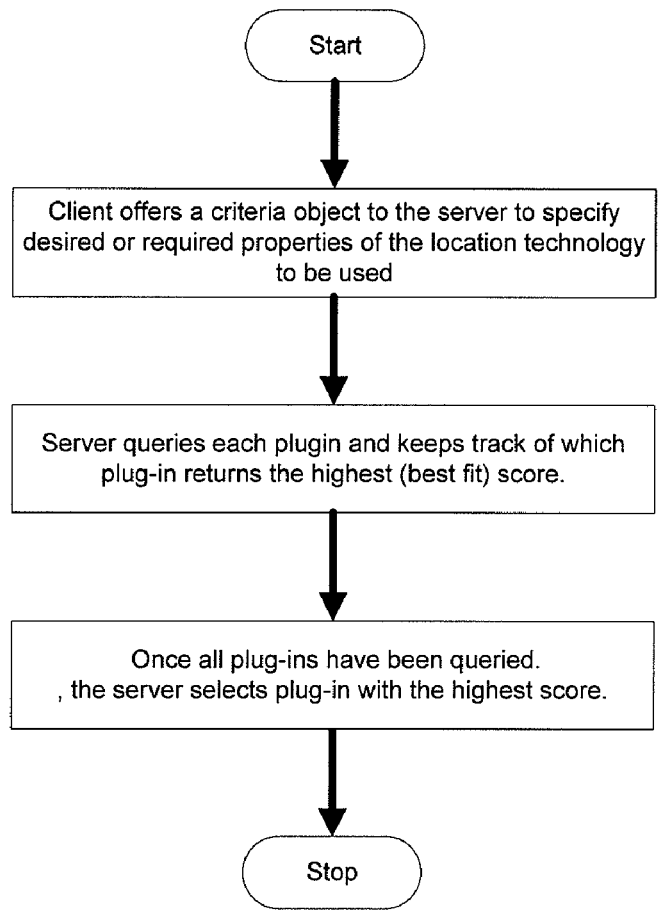
FIG. 3 illustrates the steps by which the server component queries each plug-in and keeps track of which plug-in returns the highest score and, once all plug-ins have been queried, selects the plug-in with the highest score.
Figure 4:
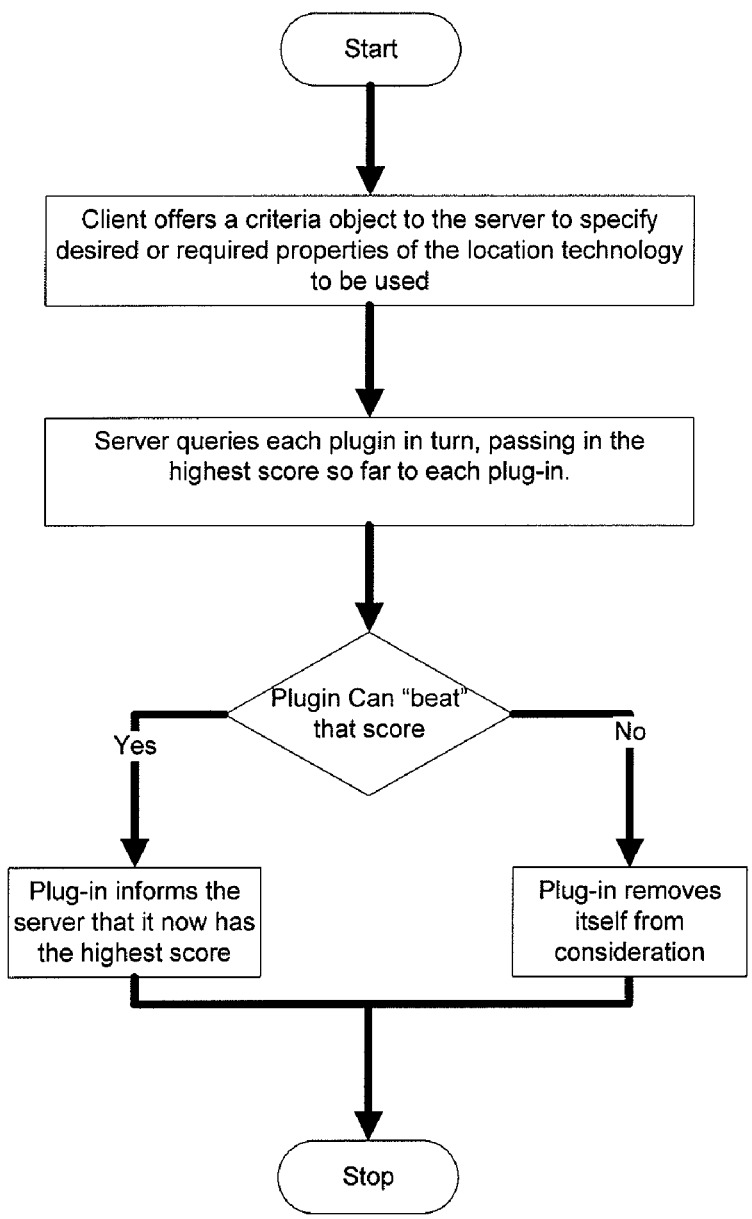
FIG. 4 illustrates the steps by which, if a plug-in cannot "beat" the highest score, it then removes itself from consideration or, if it does beat the score, how it informs the server that it now has the highest score.

The approach described within this application is based on each plug-in being capable of carrying out a deterministic calculation of a score reflecting how well the plug-in fits the specified QoS criteria. The calculation employs the current values of attributes, such as "time to next fix", which will be known to each plug-in. The calculation is deterministic and each plug-in follows the same rules to ensure a fair and correct decision is always arrived at. Many different algorithms or methods for the final selection are possible, such as:

1. The server component queries each plug-in and keeps track of which plug-in returns the highest (i.e. best-fit) score and once all plug-ins have been queried, selects the plug-in with the highest score. See FIG. 3.
2. The server component queries each plug-in in turn, passing in the highest score so far to each plug-in. If the plug-in cannot "beat" that score it removes itself from consideration; if it can beat that score, then it informs the server that it now has the highest score. See FIG. 4.

The first of these methods requires some limited decision-making by the server component, the second is a true devolution of decision-making such that the server is not involved at all. However, this invention is not restricted to these two methods, and will work with any algorithm that those skilled in the art may devise.

The invention relies on plug-ins behaving correctly when calculating their score (i.e. following the published rules for the deterministic calculation). This is not considered a deficiency of the principles involved and imposes no extra risk, since an application in all cases has to trust that the plug-ins it invokes will be well-behaved. But, if it is decided that plug-ins should not all be trusted blindly, it is still possible to check the behaviour of each one at a suitable point such as when the plug-in is installed, tested, verified or signed. Alternatively, applications may perform dynamic checking of the behaviour of a plug-in at runtime by a watchdog or other mechanism.

The present invention is considered to provide the following exemplary advantages:

It is applicable to all architectures where multiple plug-ins providing comparable services are available to applications.

It removes the need for potentially complex decision-making intelligence in all intermediate levels of application and operating system plug-in architectures.

It teaches how responsibility for optimizing the choice of plug-ins can be effectively devolved to the plug-ins themselves.

It enforces good design by avoiding the introduction of unnecessary dependencies between intermediaries and plug-in modules they service.

This invention specifies a method and apparatus enabling the resolution of which out of a set of available plug-in plug-ins is the best-fit to a set of desirable properties specified by a requesting application.

The members of the set of plug-ins are each asked to carry out a deterministic calculation of how well they conform to the set of desired properties and then return the result as a numeric score.

This enables the selection of the most suitable module without the need for explicit intervention by or decision-making intelligence in any other part of the software controlling the apparatus.

Although the present invention has been described with reference to particular embodiments, it will be appreciated that modifications may be effected whilst remaining within the scope of the present invention as defined by the appended claims.

The invention claimed is:

1. A method comprising:
   a) identifying one or more of characteristics or properties which the most suitable code module should possess;
   b) passing the identified one or more of characteristics or properties to each of a plurality of possible functionally compatible code modules, either directly by a software application or via one or more intermediate layers;
   c) using the code modules to each carry out, under control of a hardware processor, a deterministic calculation of how well they conform to the identified one or more of characteristics or properties passed to the code modules and to return the result as a numeric score, either to the software application or to an intermediate layer; and
   d) executing the module having the best score, either directly by the software application or via an instantiation performed by the intermediate layer.

2. A method according to claim 1 wherein the most suitable code module is executed in the same process as the software application.

3. A method according to claim 1 wherein the most suitable code module is executed in the same process as an intermediate layer.

4. A method according to claim 1 wherein the most suitable code module is executed in its own process.

5. A method according to claim 1 wherein, in an instance in which the module is executed by an intermediate layer, the intermediate layer comprises a singleton server.

6. A method according to claim 1 wherein the code modules consist of plug-ins which can be one or more of:
   added to or removed from a computing device dynamically; or
   dynamically detected by the intermediate layer without the software application knowing the existence or location of the modules.

7. A method according to claim 1 wherein identifying one or more of characteristics or properties comprises identifying the one or more of the characteristics or properties at least in part by the software application or some other entity requesting the execution of one or more code modules, and collecting identified characteristics or properties into a single object for passing to the intermediate layers and to each of the code modules.

8. A method according to claim 1 wherein the code module with the best score is identified either
   a) by querying each of the plurality of functionally compatible code modules and recording the scores for each;
   b) or by passing the current highest score, starting from a high score of zero, to each of the plurality of functionally compatible code modules and querying whether the score for each member is better than the current highest score.

9. A method according to claim 1 wherein the behavior of any code module in respect of an algorithm used to determine the conformity of the modules to the characteristics or properties is verified either when the said module is installed on the computing device or by any trusted authority before installation.

10. A method according to claim 1 wherein the code modules are used to implement positioning technologies or algorithms for enabling location based services.

11. A method according to claim 10, wherein the identified one or more of characteristics or properties comprise one or more of horizontal accuracy, vertical accuracy, or time to first fix.

12. An apparatus comprising a processor and a memory storing computer program code, wherein the memory and stored computer program code are configured, with the processor, to cause the apparatus to at least:
   identify one or more of characteristics or properties which the most suitable code module should possess;
   pass the identified one or more of characteristics or properties to each of a plurality of possible functionally compatible code modules, either directly by a software application or via one or more intermediate layers;

cause the code modules to each carry out a deterministic calculation of how well they conform to the identified one or more of characteristics or properties passed to the code modules and to return the result as a numeric score, either to the software application or to an intermediate layer; and execute the module having the best score, either directly by the software application or via an instantiation performed by the intermediate layer.

13. An apparatus according to claim 12, wherein the code modules consist of plug-ins which can be one or more of:
    added to or removed from a computing device dynamically; or
    dynamically detected by the intermediate layer without the software application knowing the existence or location of the modules.

14. An apparatus according to claim 12, wherein the memory and stored computer program code are configured, with the processor, to cause the apparatus to identify one or more of characteristics or properties at least in part by causing the software application or some other entity to request the execution of one or more code modules, and collecting identified characteristics or properties into a single object for passing to the intermediate layers and to each of the code modules.

15. An apparatus according to claim 12, wherein the memory and stored computer program code are further configured, with the processor, to cause the apparatus to identify the code module with the best score at least in part by querying each of the plurality of possible functionally compatible code modules and recording the scores for each.

16. An apparatus according to claim 12, wherein the memory and stored computer program code are further configured, with the processor, to cause the apparatus to identify the code module with the best score at least in part by passing the current highest score, starting from a high score of zero, to each the plurality of possible functionally compatible code modules and querying whether the score for each member is better than the current highest score.

17. An apparatus according to claim 12, wherein the behavior of any code module in respect of an algorithm used to determine the conformity of the modules to the characteristics or properties is verified either when the said module is installed on the computing device or by any trusted authority before installation.

18. An apparatus according to claim 12, wherein the code modules are used to implement positioning technologies or algorithms for enabling location based services.

19. An apparatus according to claim 12, wherein the apparatus comprises or is embodied on a mobile phone.

20. A computer program product comprising a memory having computer-readable program instructions stored therein, the computer-readable program instructions comprising:
    program instructions configured to identify one or more of characteristics or properties which the most suitable code module should possess;
    program instructions configured to pass the identified one or more of characteristics or properties to each of a plurality of possible functionally compatible code modules, either directly by a software application or via one or more intermediate layers;
    program instructions configured to cause the code modules to each carry out a deterministic calculation of how well they conform to the identified one or more of characteristics or properties passed to the code modules and to return the result as a numeric score, either to the software application or to an intermediate layer; and
    program instructions configured to execute the module having the best score, either directly by the software application or via an instantiation performed by the intermediate layer.

* * * * *